Patented May 2, 1944

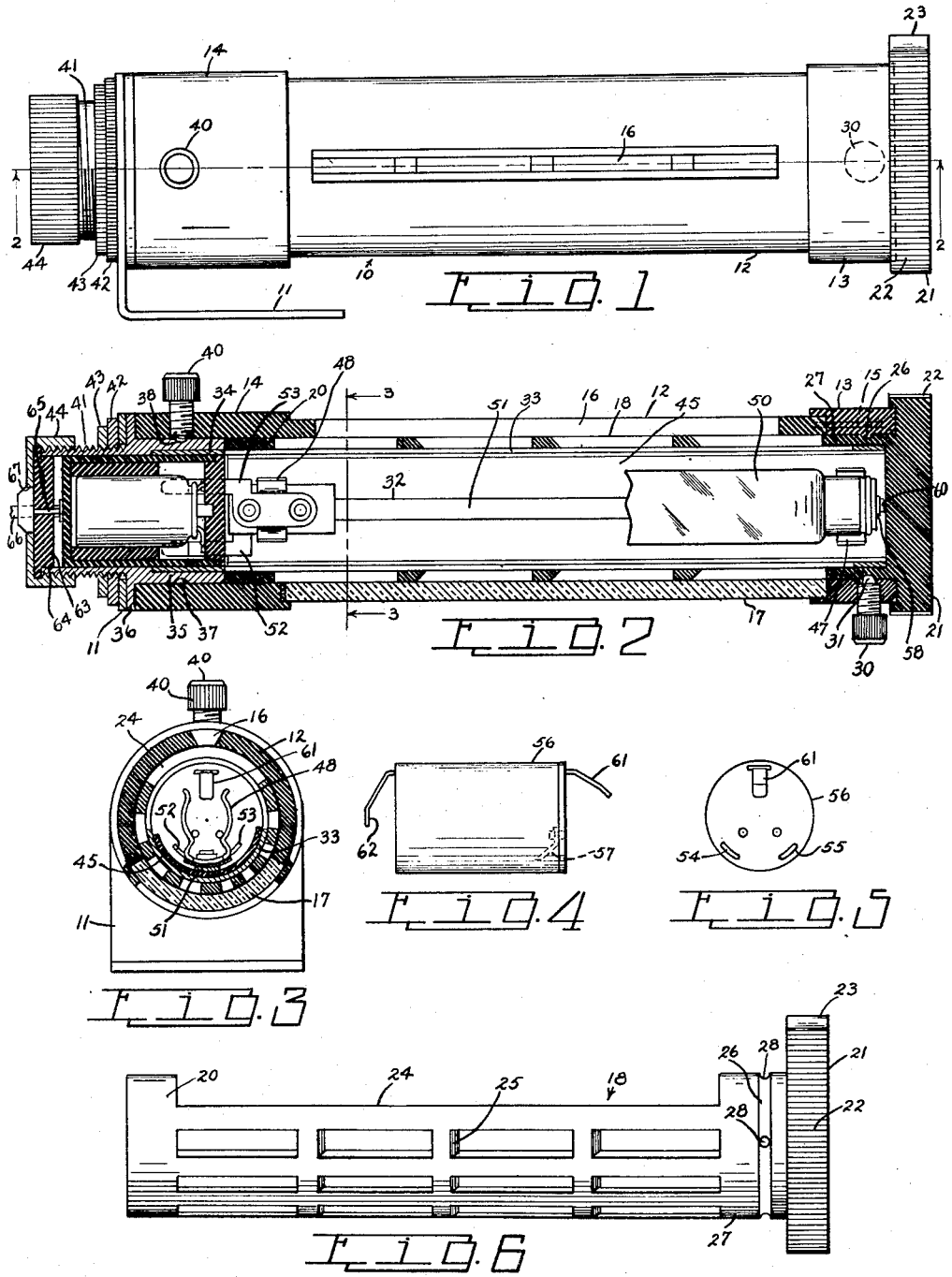

2,347,672

UNITED STATES PATENT OFFICE 2,347,672

ULTRAVIOLET INSTRUMENT LIGHT

Arnold D. Dircksen, Dayton, Ohio, and John M. Roper, Washington, D. C.

Application January 31, 1941, Serial No. 376,730

16 Claims. (Cl. 240—8.16)

(Granted under the act of March 3, 1883, as amended April 30, 1928; 370 O. G. 757)

This invention relates to an ultraviolet instrument light and has for an object to provide an improved instrument light of the ultraviolet type, especially intended for use on vehicles, particularly air vehicles.

A further object of this invention is to provide an ultraviolet instrument light in which the amount of ultraviolet light may be adjusted at the will of the operator and which further may be so adjusted as to emit visible light when desired.

A further object of this invention is to provide an ultraviolet instrument light comparatively small in weight and size, yet utilizing a fluorescent bulb which, in combination with a suitable filter and an adjustable shutter emits various degrees of ultraviolet light, which filter and shutter may be so adjusted that visible light may be emitted to the instrument board on which it may be mounted.

Still a further object of this invention is to provide an ultraviolet instrument light utilizing a fluorescent or vapor discharge lamp or bulb and a housing so constructed that it permits the use of a one-wire system, thereby eliminating the necessity for changing the wiring of the vehicle or instrumentality in which it may be mounted.

A further object of this invention is to provide a manually controllable rotatable shutter for selectively controlling the amount of ultraviolet or visible light output and control means therefor easily operable by one hand, even though the instrument be entirely in the dark.

With the foregoing and other objects in view, the invention consists in the construction, combination and arrangement of parts as will be hereinafaer more fully described.

Reference is to be had to the accompanying drawing forming a part of this specification in which like reference characters indicate corresponding parts throughout the several views and in which:

Fig. 1 is an elevational view of the ultraviolet light of this invention;

Fig. 2 is a sectional view on line 2—2 of Fig. 1;

Fig. 3 is a transverse section on line 3—3 of Fig. 2;

Fig. 4 is an elevational side view of the starter switch;

Fig. 5 is an end view in the direction looking toward the left in Fig. 4; and

Fig. 6 is an elevational view of the dimming shutter.

There is shown at 10 a completely assembled ultraviolet instrument light of this invention including a bracket 11 for suitably mounting the same at any convenient location, such as on an instrument board of an air vehicle or elsewhere wherever desired. This instrument light consists of a housing or casing 12 generally cylindrical in outline and provided with collars 13 and 14 at opposite ends thereof, the collar 14 being somewhat wider than the collar 13. This collar rib 13 is not an integral part of the housing 12 but instead is attached thereto by means of a plurality of threaded studs 15. A narrow longitudinal slit 16 is provided along one side of the housing 12, while on the opposite side there is provided a rather wide window 17 of Corex or other suitable ultraviolet filter material, this filter window 17 being held in position therein by means of the removable collar 13. Extending through the cylindrical housing 12 through the end of collar 13 thereof is a rotatable shutter 18 shaped as shown in Fig. 6. The external diameter of the main body 20 of shutter 18 is substantially identical with the internal diameter of the cylindrical housing 12 and is provided at one end with a hand wheel or disc 21 knurled as at 22 for easy manipulation, the diameter of this hand wheel 21 being somewhat greater than the external diameter of the collar 13. This hand wheel or disc 22 is also provided with a raised boss or projection 23 so that the angle of rotation of the handle wheel 21 may be easily ascertained in the dark. Coinciding with the position of this boss 23 is the shutter window 24 of a width and length substantially equal to the width and length of the filter window 17, so that when the shutter 18 is rotated to bring this shutter window 24 behind the filter window 17, the maximum amount of light may reach the filter window from the source and within, as hereinafter described. This filter window and shutter window will preferably both be approximately 120° in width. The remaining 240° of circumference of the shutter will be divided into two equal areas, one of them being provided with larger side openings 25, while the other will be provided with openings somewhat smaller than the openings 25. The bars between the openings 25 are at least equal in width to the width of the window or slot 16. A circumferential groove 26 about the neck 27 connecting the body 20 to the handle 21 is provided with three equally spaced recesses 28, one located centrally of the shutter window and the other two each located centrally of the two other areas of the rotatable shutter. The recess 28 that is located centrally of the shutter window 24 is, therefore, located in the same radius of the wheel 21 as is boss 23. Threaded through the collar 13 is a detent screw 30 provided with a spring pressed ball 31 of such a size that it will press into the circumferential groove 26 in the shutter neck 27 and will click into any one of the recesses 28 and yieldably retain the shutter in a position of rotation corresponding therewith. The head of this detent screw 30 in collar 13 acts as a projection which will be located preferably in the longitudinal center of the filter window 17 so that when the boss 23 of hand wheel 21 is rotated into alignment with the projection provided by the head of this detent screw 30, the shutter window 24 will be in alignment with and exactly behind the filter window 17. As will be seen from Fig. 2, the shutter body 20 ends just beyond the end of the filter window 17. The rotatable shutter 18 and the housing 12 will both preferably be of an insulating material, such as hard rubber or other natural or artificial plastic, some of which are commercially known as Bakelite.

Extendable through the other end of the cylindrical housing 12 is a lamp bracket 32 consisting of a metal semi-cylinder 33 having one cylindrical end 34 sweated within a collar 35. This collar 35 has an external diameter substantially equal to the internal diameter of the housing collar 14, the collar 35 having an externally extending flange 36 which abuts against the end of housing collar 14. A groove 37 extending about the collar 35 is provided with a series of recesses 38 to cooperate with a detent screw 40 identical with the detent screw 30 so that the collar 35 and its attached lamp bracket 32 may be rotated within the housing 12 and relative to the slit 16 and the filter window 17.

Extending beyond the flange 36 is a threaded neck 41 over which extends the bracket 11 through which it is secured by a knurled nut 42 and a locking knurled nut 43. A cap nut 44 extends over the end of threaded neck 41 for holding the mechanism therewithin. This mechanism is secured within the housing 12 by a cap nut 44 and includes the aforementioned lamp bracket 32 and also includes an insulation semi-cylinder 45 within the metal semi-cylinder 33. Mounted on this insulation semi-cylinder at opposite ends thereof are a pair of fluorescent lamp sockets 47 and 48 for supporting the cylindrical ends of a fluorescent or vapor discharge bulb or lamp 50 therebetween. Extending from the socket 47 is a metal ribbon 51 passing beneath and insulated from the socket 48 and terminating in a prong 52, while the socket 48 has a similar prong 53 extending therefrom. These prongs 52 and 53 extend through slots 54 and 55 of a cylindrical starting switch 56 into wiping contact with starter contacts 57 within the starter switch 56. One flat end of lamp 50 is in contact with a finger 60 extending from the metal semi-cylinder 33, while the flat end (not shown) of the lamp 50 is in wiping contact with a ribbon 61 which extends through the shell of the starter switch 56 and terminates in a contact ribbon 62 outside the other end thereof. This starter switch 56 is placed within the collar 35 and is held in position by an insulating washer 63 having a reduced neck 64 so it will fit within the end of the threaded collar 41. Extending through this insulating washer 63 at the center thereof is a metallic grommet 65 which presses against the contact ribbon 62.

A power wire 66 may be connected as by solder through an opening 67 in the cap nut 44 to the grommet 65, thus completing the power supply to the fluorescent lamp bulb 50, the lamp bulb 50 being grounded through its end contacts 58 and the finger 60 from the metal semi-cylinder 33 through collar 35 and bracket 11.

In operation, the position of the lamp 50 relative to the longitudinal slit 16 and the filter window 17 may be controlled by rotating the housing 12, using the detent screw to secure a purchase thereon, so that the lamp 50 will direct either visible rays through the slit 16 or will direct its rays through the filter window 17, but not both at the same time. When the filter window is in position to receive the rays, the amount of ultraviolet light that may escape therefrom may be controlled by means of hand wheel 22 with its indicating knob 23 on the shutter 18 to permit either the maximum amount of ultraviolet light to pass therethrough by means of the large shutter opening 24 or a lesser amount by rotating it to either of the other two positions such as the intermediate openings 25 or the smaller size openings. As a result, it is possible for the operator to secure either visible light from the instrument or to secure graduated amounts of ultraviolet light, as desired.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

We claim:

1. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, and a rotatable shutter mechanism within said housing between said lamp mechanism and said housing permitting light rays from said fluorescent lamp to reach either said longitudinal slit or said filter window exclusively.

2. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, means for rotatably mounting said housing on said lamp mechanism, a shutter mechanism within said housing between said lamp mechanism and said housing permitting light rays from said fluorescent lamp to reach either said longitudinal slit or said filter window exclusively, and means for rotating said shutter mechanism relative to said housing.

3. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, means for rotatably mounting said housing on said lamp mechanism, a graduated shutter mechanism within said housing between said lamp mechanism and said housing, said ultraviolet lamp mechanism including a longitudinal lamp and a semi-cylindrical mounting means therefor acting as a semi-cylindrical light shield whereby said housing may be rotated to permit light rays from said fluorescent lamp to reach either said longitudinal slit or said filter window exclusively.

4. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, means for rotatably mounting said housing on said lamp mechanism, a shutter mechanism within said housing between said lamp mechanism and said housing, means for rotating said shutter mechanism relative to said housing, said ultraviolet lamp mechanism including a longitudinal lamp and a semi-cylindrical mounting means therefor acting as a semi-cylindrical light shield whereby said housing may be rotated to permit light rays from said fluorescent lamp to reach either said longitudinal slit or said filter window exclusively.

5. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, a shutter mechanism within said housing between said lamp mechanism and said housing permitting light rays from said fluorescent lamp to reach either said longitudinal slit or said filter window exclusively, said shutter mechanism including windows of different areas permitting different amounts of light to pass therethrough from said lamp mechanism to said filter window.

6. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, a shutter mechanism within said housing between said lamp mechanism and said housing, means for rotating said shutter mechanism relative to said housing, said ultraviolet lamp mechanism including a longitudinal lamp and a semi-cylindrical mounting means therefor acting as a semi-cylindrical light shield, said shutter mechanism including windows of different areas permitting different amounts of light to pass therethrough at different angles of rotation about said lamp mechanism.

7. An ultraviolet instrument light comprising a cylindrical housing, an ultraviolet filter window extending longitudinally thereof, a slit, allowing rays of light having a frequency within the visible spectrum to pass therethrough, extending longitudinally thereof circumferentially displaced from said ultraviolet filter window, a fluorescent lamp mechanism within said housing, means for rotatably mounting said housing on said lamp mechanism, a shutter mechanism within said housing between said lamp mechanism and said housing, means for rotating said shutter mechanism relative to said housing, said ultraviolet lamp mechanism including a longitudinal lamp and a semi-cylindrical mounting means therefor acting as a semi-cylindrical light shield whereby said housing may be rotated to permit light rays from said fluorescent lamp to reach either said longitudinal slit or said filter window exclusively, said shutter mechanism including windows of different areas permitting different amounts of light to pass therethrough at different angles of rotation about said lamp mechanism.

8. A lamp structure comprising a cylindrical casing having an elongated window in the side wall thereof, a closure plug for one end of said casing having a hollow threaded stem thereon, a contact terminal mounted within said hollow threaded stem and insulated therefrom, a supporting member having an opening for receiving said stem, a clamping nut threaded on said stem for securing said member to said stem, an insulating shell mounted within said casing having an opening coincident with the window in said casing wall, lamp contacts mounted at the opposite ends of said insulating shell, a fluorescent lamp supported within said insulating shell and having terminals at its opposite ends connected to the contacts supported in the opposite ends of said shell, one of said end contacts being adapted for connection with said terminal contact mounted within said stem, a rotatable cap closing the opposite end of said casing, and a shutter rotatable relative to said casing having a plurality of openings therein and connected to said cap, whereby the rotation of said cap will rotate said shutter to place one or more of said openings in coincidence with the elongated window in said shell.

9. A lamp structure comprising a cylindrical open ended casing having an elongated window in one wall thereof, means for supporting a fluorescent lamp in said casing, a closure cap for one end of said casing rotatively mounted relatively to said casing and a shutter member connected with said rotatable cap having a plurality of openings therein varying graduatingly in size circumferentially of said shutter drivingly connected with said cap whereby the rotation of said cap will rotate said shutter member to bring said openings into coincident relation with the elongated window in the casing, a plug member for the opposite end of said casing having a hollow stem formed thereon, said stem being adapted to receive a terminal contact member therein, a bracket for supporting said lamp structure having an opening therein for the reception of said stem, a clamping nut threaded on said bracket and adapted to clamp said bracket between said nut and said plug to rotatively support said lamp structure on said bracket.

10. In a lighting device, a support having a cylindrical base, a lamp carried by said base, a cylindrical casing rotatively carried by said base, a window in said casing, detent means adapted to hold said casing in selected rotative positions on said base, a projection on said means extending outwardly from said casing, a shutter element rotatively carried by said casing to selectively control the light output from said window, detent means for holding said shutter element in selected rotative positions in said casing, a projection on said last-named means extending outwardly from said casing, and a projection rotatable with said shutter element and adapted to pass in juxtaposition with said projection on said last-named means to indicate a particular position of said shutter element.

11. In a lighting device, a hollow cylindrical support, means for holding a vapor discharge lamp in extended axial relation with said support and producing visible and ultra violet light, a lamp starting device housed within said support, a cylindrical casing rotatively mounted on said support and surrounding said lamp, a window in said casing, a light filter in said window capable of transmitting ultraviolet light only, a longitudinal slot in said casing capable of transmitting visible light, and a generally cylindrical cage-like shutter element rotatively mounted within said casing to control the light outputs from said window and said slot.

12. In a lighting device, a support having a cylindrical base, a lamp carried axially of said base, a cylindrical casing surrounding said lamp, a window in said casing, means for rotatively mounting said casing on said base so that said window may be turned to a desired direction, frictional means for removably holding said casing on said base and for holding said casing in selected rotative positions, a generally cylindrical cage-like shutter element having graduated light openings rotatively carried within said casing, frictional means for removably holding said shutter elements in said casing and for holding said shutter element in selected rotative positions with respect to said casing to control the light output from said window, a disc on the end of said shutter element to close the outer end of said casing and to provide manipulable means for rotating said shutter element, a projection on said casing adjacent said disc, and a projection on said disc to indicate by its relation to said first-named projection the position of said shutter in relation to said window.

13. A lighting device as defined in claim 12 in which each of said frictional means comprises a housing extending through a wall of said casing, one of said housings being at each end of said casing, and the housing comprising said second named frictional means constituting said projection on said casing, each of said housings containing a spring operated detent, one of said detents engaging a groove in said cylindrical base, and the other of said detents engaging a groove in said shutter element.

14. A lighting device for vehicle instrument panels and the like comprising a support having a cylindrical base, a lamp carried axially of said base and producing visible and ultra violet light, a cylindrical casing surrounding said lamp and provided with two spaced windows, each extending approximately the length of the casing, one of said windows being capable of transmitting ultraviolet light only and the other of said windows transmitting at least a portion of the visible light produced by said lamp, said casing being rotatively mounted on said base so that said windows may be turned to desired directions, and a cage-like shutter element having graduated light openings rotatively mounted within said casing to control the light outputs from said windows.

15. The invention as defined in claim 10 wherein a disc on one end of said shutter element forms a closure for an end of said casing and constitutes manipulable means for rotating said element to regulate the light output from said window, the said projection rotatable with said shutter element being formed on the periphery of said disc.

16. The invention as defined in claim 14, wherein said shutter element is constructed of a plurality of longitudinally extending bars having a width substantially equal to that of said second-mentioned window, the spacing between a certain two of said bars being substantially equal to the width of said first-mentioned window and the spacing between the remainder of said bars being uniformly varied in magnitude so that, upon rotation of said shutter, said second-mentioned window will be alternately opened and closed and said first-mentioned window will be gradually opened or closed.

ARNOLD D. DIRCKSEN.
JOHN M. ROPER.